Jan. 26, 1960  A. B. HUNTINGTON ET AL  2,922,432
REVERSIBLE CARTRIDGE SPEED CONTROL VALVE
Filed May 9, 1957
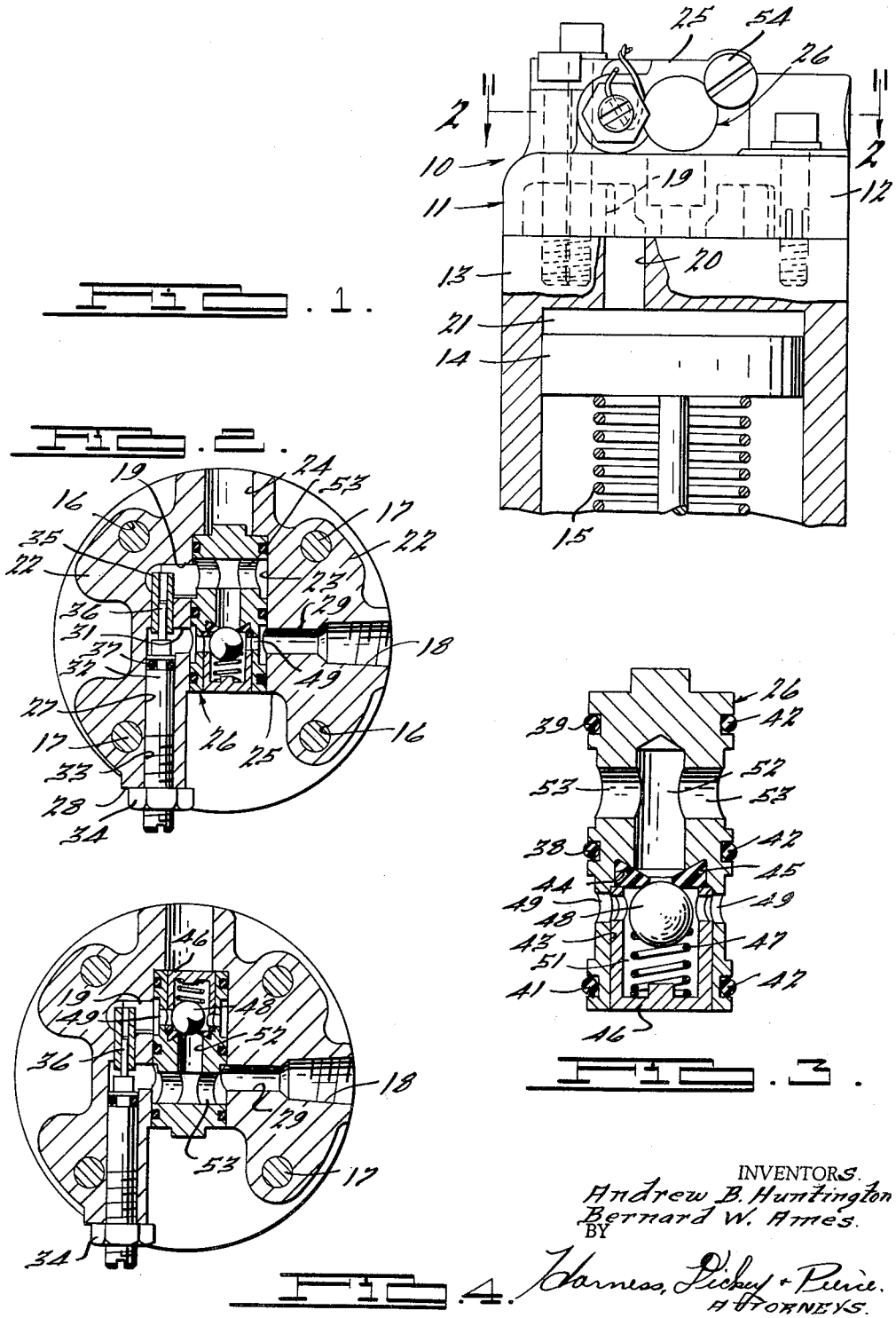
INVENTORS.
Andrew B. Huntington
Bernard W. Ames
BY
Harness, Dickey & Pierce.
ATTORNEYS.

United States Patent Office 2,922,432
Patented Jan. 26, 1960

2,922,432

REVERSIBLE CARTRIDGE SPEED CONTROL VALVE

Andrew B. Huntington, Royal Oak, and Bernard W. Ames, Ferndale, Mich., assignors to Ross Operating Valve Company, Detroit, Mich., a corporation of Michigan Application May 9, 1957, Serial No. 658,076

6 Claims. (Cl. 137—269.5)

This invention relates to reversible speed control valves, and more particularly to fluid control devices of the type having an adjustable one-way restriction and in which the direction of this restriction may be reversed from time to time.

The applications of fluid control devices which have adjustably restricted flow in one direction and unrestricted flow in the opposite direction are widespread in present day industry. There are many conditions under which it is desirable to change the speed control valve from time to time so that the directions of the restricted and unrestricted flows will be reversed. More particularly, if the speed control valve is being used in conjunction with a fluid motor which is to be advanced slowly and retracted quickly, it may be desired to change the operation to one in which the advance is rapid and the retraction slow.

Conventional speed control valves in which both ports are pipe-tapped must be reversed by disconnecting and reconnecting the conduits. Different problems arise when the speed control valve is used as a pilot section mounted on a main valve, only one of the ports of the pilot section valve being pipe-tapped while the other port opens directly into the main valve spool chamber. In such constructions, an individual speed control valve of conventional construction can perform its control function only in a single direction. A user of such valves must therefore purchase two types of constructions in order to have available the proper equipment for each set-up.

It is an object of the present invention to overcome the foregoing deficiencies of previously known speed control valve constructions and to provide an improved speed control valve which can be reversed without the necessity of uncoupling conduits or performing any other time-consuming operation.

It is another object to provide an improved speed control valve of this nature which is especially adapted for use as a pilot section and which will permit the user to purchase only a single type of valve for all operations.

It is also an object to provide a novel reversible speed control valve having the above characteristics, and which is of simple and economical construction having a minimum of moving parts.

Other objects, features and advantages of the present invention will become apparent from the subsequent description, taken in conjunction with the accompanying drawings.

In the drawings:

Figure 1 is a front elevational view of an improved pilot section sequence head constructed according to the principles of this invention, showing the location of the reversible cartridge and a portion of a main valve;

Figure 2 is a cross-sectional plan view taken along the line 2—2 of Figure 1 and showing the adjustable restriction as well as the porting and interior cartridge construction;

Figure 3 is an enlarged cross-sectional view showing the construction of the cartridge; and Figure 4 is a view similar to Figure 2 but with the cartridge in its reversed position.

In general terms, the invention comprises a housing having one port adapted to be connected to a fluid conduit and a second port adapted to be connected to an operator for a fluid valve or the like. In the illustrated embodiment, the base of the housing is adapted for mounting on the top of a main valve to act as a pilot section, with the pilot port leading through the housing base. An adjustable restriction is mounted in the housing between the two ports. The housing is provided with a bore within which is mounted a reversible cartridge which carries a spring-loaded check valve, a longitudinal passageway, and a plurality of transverse passageways. The arrangement is such that when the cartridge is inserted in the housing bore in one position, fluid will flow freely from the pilot port to the conduit port through the check valve, but can only pass from the conduit port to the pilot port through the adjustable restriction. When the cartridge is removed, reversed and reinserted in the housing bore, fluid may flow freely from the conduit port to the pilot port but may only flow from the pilot port to the conduit port through the adjustable restriction.

Referring more particularly to the drawings, in which the novel sequence head is indicated generally at 10, a housing generally indicated at 11 is provided, this housing being generally circular in shape and having a flat base 12 adapted to be mounted on a main valve housing 13 having a piston operator 14 urged upwardly by a spring 15. Housing 11 is provided with a plurality of apertures 16 within which are mounted bolts 17 for securing sequence head 10 to valve housing 13.

Housing 11 is further provided with a conduit port 18 extending inwardly from one side thereof, this port being pipe-tapped so that a fluid conduit may be connected thereto. Extending upwardly from base 12 of housing 11 is a port 19 which may be termed a pilot port since it is adapted to be aligned with the port 20 extending through valve housing 13 to piston chamber 21. The upper portion of housing 11 has an irregular shape, as shown in Figure 2, including lobes 22 for accommodating bolt apertures 15. An intermediate portion of housing 11 is provided with a bore 23 extending transversely to port 18, this bore being preferably of a constant diameter and terminating at its inner end in a bore 24 of smaller diameter which extends to the opposite side of the housing. The outer end of bore 23 terminates in a flat face 25 on housing 11. Bore 23 is adapted to receive a reversible cartridge generally indicated at 26, the details of which will be described below. In parallel relation with bore 23 is a bore 27 of somewhat smaller diameter extending from a flat face 28 on housing 11 to port 19. A passageway 29 extends from port 18 to bore 23, while a passageway 31 extends from bore 27 to bore 23, passageways 29 and 31 being substantially aligned.

A metering stem 32 is mounted within bore 27 so as to provide an adjustable restriction between port 19 and passageway 31. More specifically, the outer portion 33 of bore 27 is threaded, and metering stem 27 is threadably mounted in this portion of the bore as shown in Figure 2, a lock nut 34 being provided at the outer end of the stem. A sleeve 35 is fixed within the inner portion of bore 27, and stem 32 is provided with a tapered point 36 fitting within sleeve 35. A seal 37 is provided on stem 32 to prevent leakage of fluid past passageway 31.

The construction of cartridge 26 is shown in detail in Figure 3. It will be seen from this figure that the cartridge is of generally cylindrical shape with a centrally located annular seal retaining slot 38 and similar slots 39 and 41 located adjacent the opposite ends of cartridge 26 and equidistantly spaced from slot 38. These slots are adapted to retain seals 42 for engagement with bore 23 of housing 11. A bore 43 is provided in one end of cartridge 26, this bore terminating in a slightly smaller bore 44 within which is mounted an annular valve seat 45. A spring retainer 46 is secured within bore 43 and encloses a spring 47 which engages a spherical valve 48, the valve being movable between a position in engagement with seat 45 and a position lifted from the seat. A plurality of radial passageways 49 are provided in cartridge 26 leading outwardly from chamber 51 in insert 46. A longitudinal passageway 52 extends from valve seat 45 toward the other end of cartridge 26 but terminates short of the other end. A plurality of radial passageways 53 connect passageway 52 to the outer surface of cartridge 26. The cartridge has a lesser diameter adjacent passageways 49 and 53 than adjacent seals 42, thus forming annular chambers connecting the outer ends of each set of passageways.

The dimensions of the parts are such that when cartridge 26 is inserted in bore 23 in one position, passageways 49 will be aligned with passageways 29 and 31, thus connecting the latter two passageways to chamber 51. At the same time, passageways 53 will be connected to port 19, thus connecting this port to longitudinal passageway 52. When the cartridge is reversed, passageways 53 will be aligned with passageways 29 and 31, whereas passageways 49 will be connected with port 19. A set screw 54, shown best in Figure 1, is provided on housing 11 to hold cartridge 26 in either of its positions.

*Operation*

Assuming it is desired to operate piston 14 slowly in a downward direction but quickly in an upward direction, cartridge 26 will be positioned as shown in Figure 2. Upon application of pressure to port 18, fluid will flow through passageway 29, one passageway 49, chamber 51, another passageway 49, passageway 31, sleeve 35 past restriction 36 to port 19, and thence to passageway 20 and chamber 21. It will be noted that during this fluid flow the fluid cannot flow directly from port 18 to port 19 since valve 48 is in its closed position. The fluid will thus flow at a retarded rate to chamber 21, causing piston 14 to descend slowly.

To raise piston 14, port 18 is connected to tank or atmosphere. The pressurized fluid within chamber 21 will flow through passageway 20, port 19, passageways 53 and passageway 52, and will lift valve 48 to flow through chamber 51, one passageway 49 and passageway 29 to port 18. It will be noted that although fluid could flow in a parallel path past restriction 36, the path past valve 48 will be relatively unrestricted so that piston 14 will rise rapidly as urged by spring 15.

If it is desired that the downward movement of piston 14 be rapid and the upward movement slow, set screw 54 will be removed and cartridge 26 slipped out of bore 23 by pushing it with a tool inserted through access opening 24. The cartridge will then be turned end for end and reinserted in bore 23, set screw 54 being replaced. Application of fluid pressure to port 18 will cause fluid to pass through passageway 29, passageways 53 and passageway 52 to lift valve 48. Fluids will thereupon flow through passageways 49 to port 19. Although fluid could also flow through passageways 53 and 31 to restrictions 36, the path of least resistance will be through valve 48 so that flow will be unrestricted, and piston 14 will be moved down rapidly.

To lift piston 14, port 18 is connected to tank or atmosphere. Fluid will flow from port 19 past restriction 36 and through passageways 53 and 29 to port 18. Since valve 48 is pressed against seat 45, fluid cannot follow an unrestricted path to port 18, and piston 14 will therefore ascend slowly.

It should be noted that since it is only necessary to reverse cartridge 26 to reverse the direction of retarded flow, assemblies comprising sequence head 10 and main valve 13 could be supplied in quantity to an industrial concern having need for sequence heads of both types in their operations. It should also be observed that the angular position of cartridge 26 is unimportant when it is inserted in bore 23 since passageways 49 and 53 are provided at various circumferential positions in the cartridge. The fact that cartridge 26 carries seals 42 thereon makes it unnecessary to make special arrangements for sealing the various passageways from each other. Since seal grooves 39 and 41 are equidistant from central seal groove 38, seals 42 will perform equivalent functions with either position of the cartridge. The presence of cartridge 26 will in no way interfere with the adjustability of metering stem 32, which may be readily adjusted by a screw driver or other tool from outside the housing.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a reversible speed control valve, a housing, first and second ports in said housing, a bore in said housing, a cartridge slidably mounted in said bore, said ports being connected to said bore at axially spaced points, metering stem means in said housing connected between said first and second ports, check valve means in said cartridge, including passageway means in communication with said ports, the location of said passageway means and check valve being such that fluid flow from said first port to said second port will be metered when said cartridge is in one position in said bore and fluid flow from said second port to said first port will be metered when said cartridge is axially reversed.

2. The combination according to claim 1, said cartridge comprising a transverse passageway adjacent one end thereof, a second transverse passageway adjacent the other end of said cartridge, and a longitudinal passageway connecting said transverse passageways, said check valve being disposed at one end of said longitudinal passageway.

3. In a reversible pilot metering head, a housing adapted to be mounted on a valve casing, a conduit port in said housing adapted to be connected to a threaded conduit, a pilot port in said housing adapted to be aligned with a valve operating port in said casing, a bore in said housing, said ports being connected to said bore, a passage between said conduit port and said pilot port, an adjustable metering stem in said passage, a cartridge insertable in said bore in either axial direction, and check valve means in said cartridge including passageway means in communication with said conduit and pilot ports, said passageway means and check valve being so positioned as to permit metered fluid flow only from said conduit port to said pilot port when said cartridge is in one position and only from said pilot port to said conduit port when said cartridge is in its reversed position in said bore.

4. The combination according to claim 3, said metering stem being parallel to said bore and connected to said pilot port.

5. In a reversible metering head adapted to be mounted on a valve casing, a circular housing having a flat surface for securing the housing to the valve casing, a first port in the peripheral wall of said housing adapted to be connected to a threaded conduit, a second port in said flat surface adapted to be aligned with a valve casing port, a bore in said housing transverse to said first port, said first and second ports being connected to said bore at axially spaced points, a metering passage connecting said first port and said second port, a portion of said metering passage being aligned with the connection between said first port and said bore, a metering stem in said passage, a cylindrical cartridge, a plurality of radial passageways adjacent one end of said cartridge, a second group of radial passageways adjacent the other end of said cartridge, the positions of said passageways being such that one group of passageways will be aligned with said second port bore connection and the other group of passageways will be aligned with said first port bore connection and said metering passageway portion when said cartridge is inserted in said bore with either axial orientation, a longitudinal passageway in said cartridge connecting said groups of radial passageways, a check valve disposed within one end of said passageway, and a valve seat at the adjacent end of said longitudinal passageway, whereby metered fluid flow between said ports will be in one direction when said cartridge has one axial orientation in said bore and will be in the opposite direction when said cartridge has the opposite axial orientation.

6. The combination according to claim 5, said cartridge being further provided with a centrally located annular seal groove and two end seal grooves equidistantly spaced from said central groove, and annular seals disposed within said grooves engageable with said bore when said cartridge is inserted therein.

References Cited in the file of this patent

UNITED STATES PATENTS

| 631,036 | Crump | Aug. 15, 1899 |
| 2,493,937 | Wright | Jan. 10, 1950 |
| 2,637,340 | Bent | May 5, 1953 |

FOREIGN PATENTS

| 517,301 | Canada | Oct. 11, 1955 |

Disclaimer 2,922,432.—*Andrew B. Huntington*, Royal Oak, and *Bernard W. Ames*, Ferndale, Mich. REVERSIBLE CARTRIDGE SPEED CONTROL VALVE. Patent dated Jan. 26, 1960. Disclaimer filed Aug. 7, 1962, by the assignee, *Ross Operating Valve Company*.

Hereby enters this disclaimer to claim 1 of said patent.

[*Official Gazette September 11, 1962.*]